Aug. 29, 1950 — L. D. CAHILL ET AL — 2,520,115
SERVOMOTOR FOR AIRCRAFT CONTROLS
Filed March 30, 1946 — 4 Sheets-Sheet 1
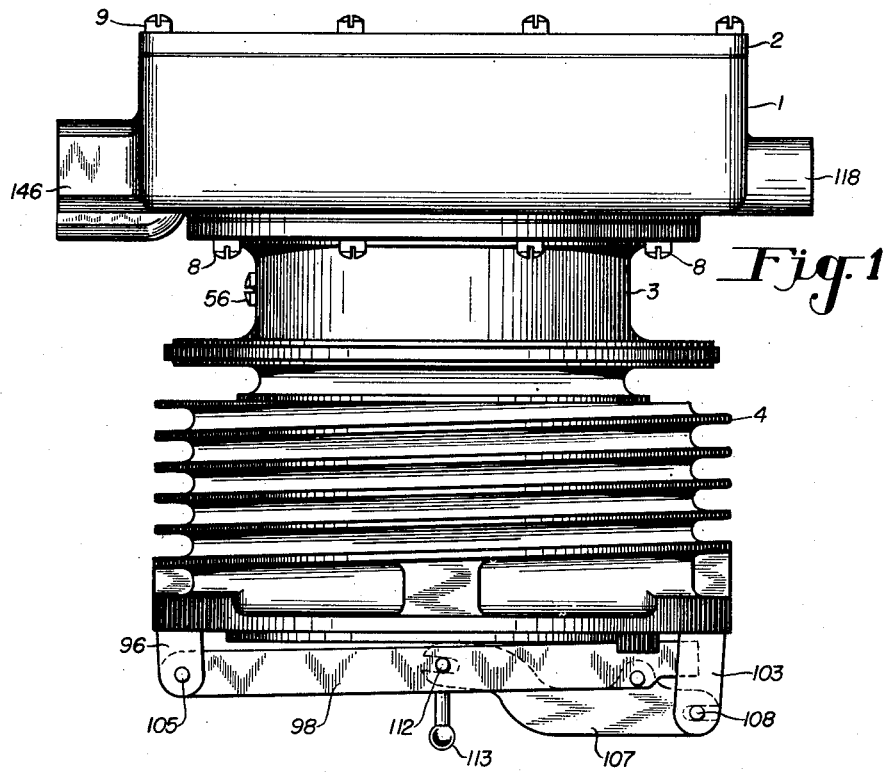
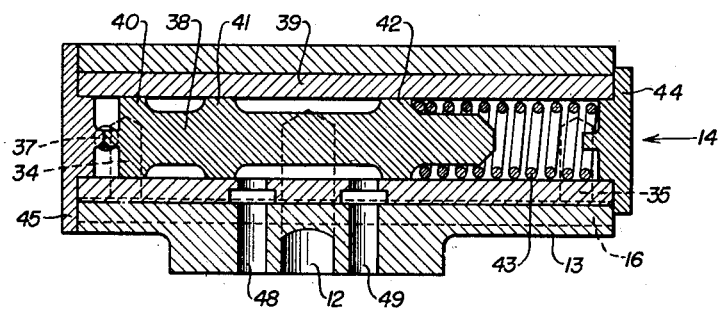
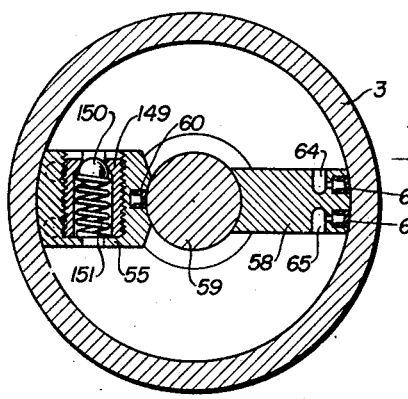
INVENTOR.
LYSLE D. CAHILL
WALTER T. BUHL
ALFRED S. HORWITZ
BY Frank H Harmon
ATTORNEY

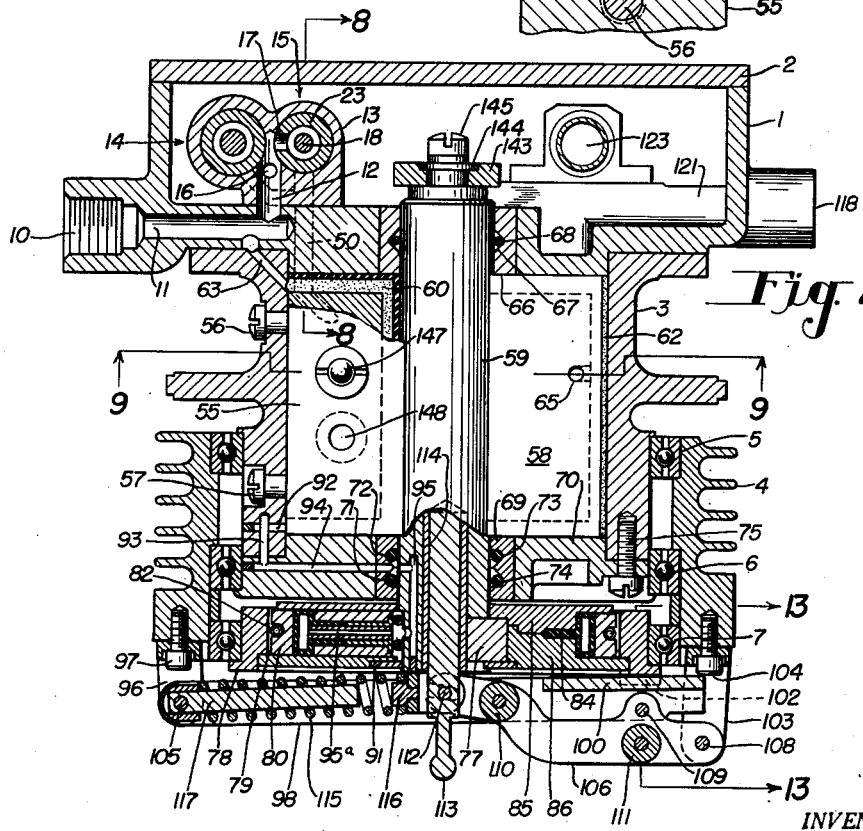

Aug. 29, 1950 L. D. CAHILL ET AL 2,520,115
SERVOMOTOR FOR AIRCRAFT CONTROLS
Filed March 30, 1946 4 Sheets-Sheet 3

INVENTOR.
LYSLE D. CAHILL
WALTER T. BUHL
BY ALFRED S. HORWITZ
Frank H. Harmon
ATTORNEY

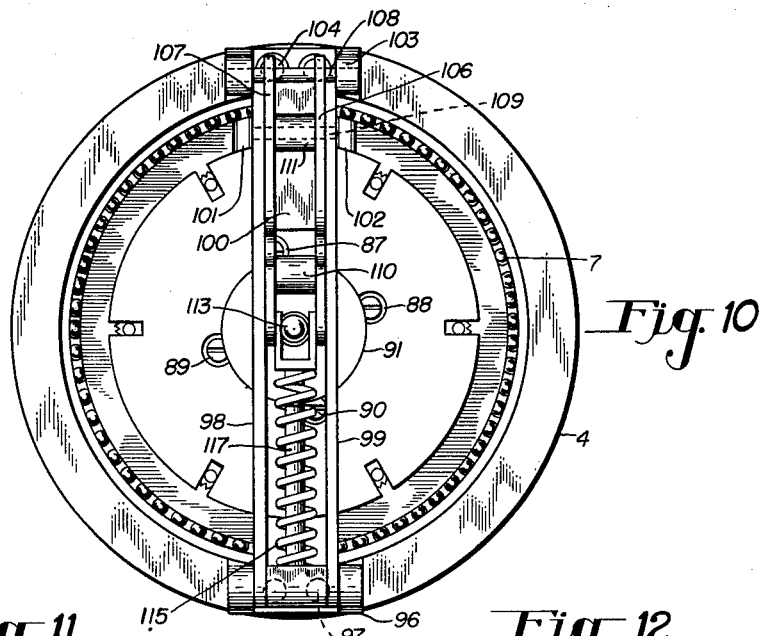
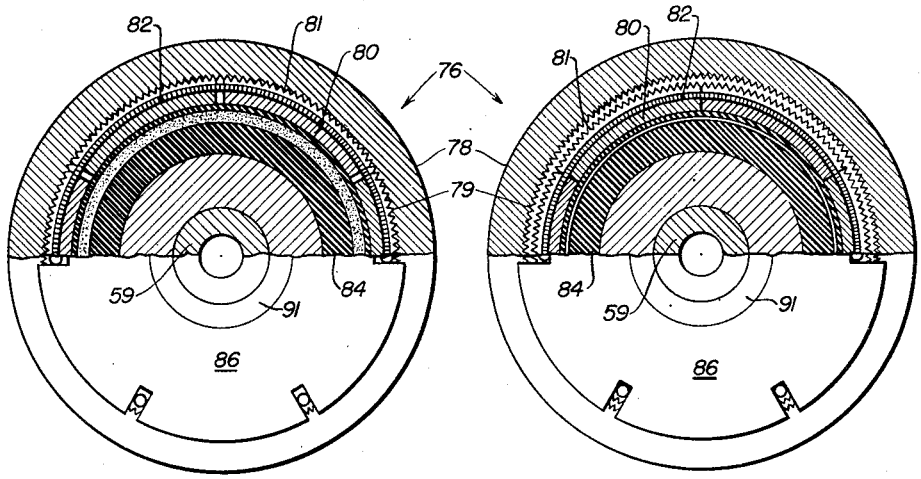
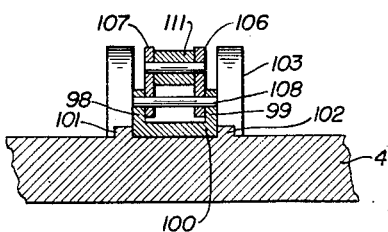

Patented Aug. 29, 1950

2,520,115

UNITED STATES PATENT OFFICE 2,520,115

SERVOMOTOR FOR AIRCRAFT CONTROLS

Lysle D. Cahill, South Euclid, and Walter T. Buhl and Alfred S. Horwitz, Shaker Heights, Ohio, assignors to Jack & Heintz Precision Industries, Inc., Cleveland, Ohio, a corporation of Delaware Application March 30, 1946, Serial No. 658,558

7 Claims. (Cl. 192—.096)

This invention relates to servo units for aircraft automatic pilots and has for one of its primary objects to provide a self-contained hydraulic servo to include an automatic built-in follow-up system therein.

Another object is to provide an hydraulic servo with a pressure responsive built-in by-pass valve means for engaging and disengaging the automatic pilot.

A further object is to provide an hydraulic servo with a built-in, self aligning balanced oil valve means for controlling flow to and from the motor in the servo.

Another object is to provide an automatic braking system responsive to introduction of fluid pressure to the servo for causing a positive engagement between the motor and the main cable drum of the servo.

A further object is to provide in the servo a positive, emergency, mechanical disconnect means between the motor and the main cable drum on the servo.

With the foregoing and other objects in view the invention resides in the combination of parts and in the details of construction set forth in the following specification and appended claims, certain embodiments thereof being shown in the accompanying drawings, in which:

Figure 1 is a view in elevation of the servo unit;

Figure 2 is a view in vertical section of the servo unit;

Figure 7 is an enlarged detail view in section taken along the line 7—7 of Figure 6, showing the by-pass oil valve;

Figure 8 is an enlarged detail view in section taken along line 8—8 of Figure 2, showing the balanced oil valve;

Figure 9 is a detail view in section taken along line 9—9 of Figure 2, showing the hydraulic motor portion of the servo unit;

Figure 10 is an end view of the servo unit as shown in Figure 1;

Figure 11 is a view partly in plan and partly in cross section of the clutch or "Hayes Brake" portion of the servo unit in its expanded or engaged position;

Figure 12 is a view similar to Figure 11, showing the clutch or "Hayes Brake" in disengaged position;

Figure 13 is an enlarged detail view in section taken along line 13—13 of Figure 2, showing the mechanical linkage between the clutch or "Hayes Brake" portion of the servo and the drum; and Figure 14 is an enlarged view in longitudinal section of the metering bushing shown in Figure 4.

Figure 3:
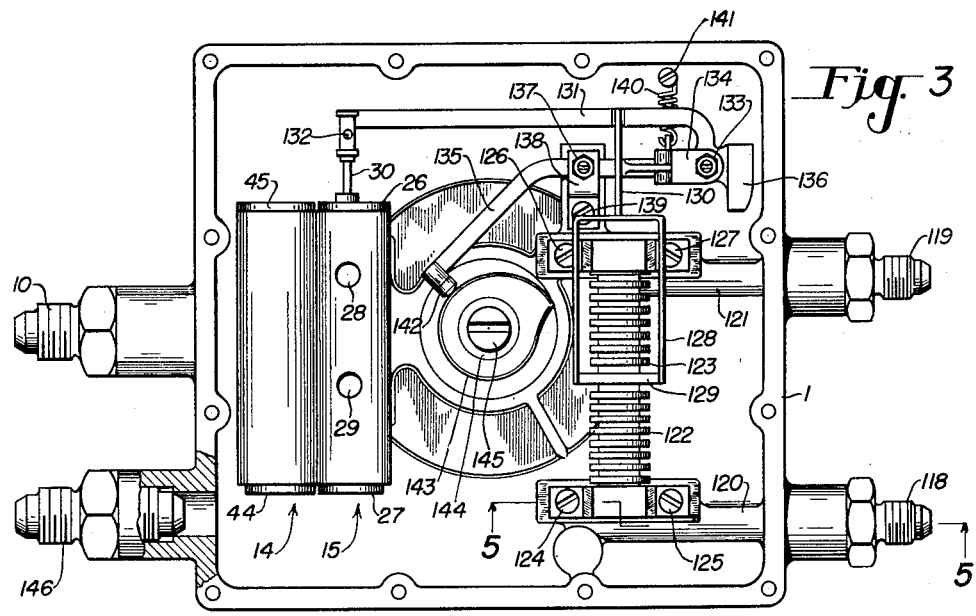
Figure 3 is a bottom plan view of the base of the servo unit with the cover plate removed.

Referring more particularly to Figure 2 the servo consists essentially of a base 1 having a cover plate 2, a motor casing 3 and a drum 4. The drum 4 is carried about the motor casing 3 by means of bearings 5, 6 and 7. The casing 3 is secured to the base 1 by means of screws 8 as seen in Figure 1. The cover plate 2 is secured to the base by screws 9.

Figure 4:
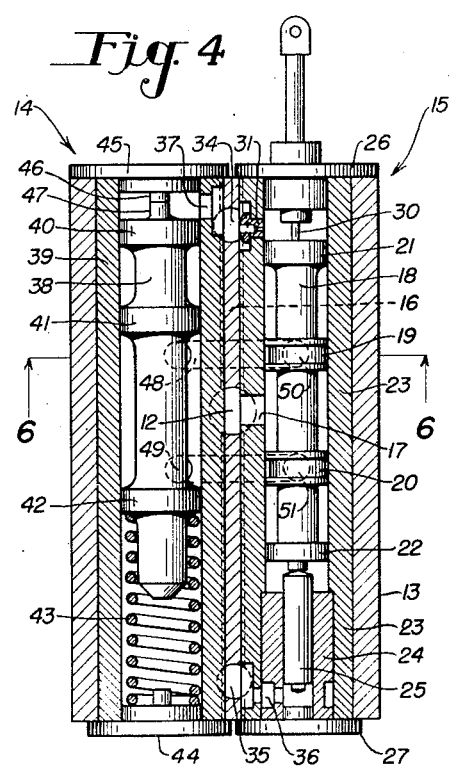
Figure 4 is an enlarged detail view of the by-pass oil valve and the balanced oil valve shown in Figure 3.

In Figure 2 a pressure fluid inlet 10 is shown on base 1 leading to a passage 11 in the base. Passage 11 delivers pressure fluid to a second passage 12 in the housing 13 for the by-pass valve 14 and the balanced oil valve 15. A passage 16 in housing 13 running between and parallel to the valves 14 and 15 acts as a manifold in delivering pressure fluid from passage 12 to one end of the valve 14 and to both ends of valve 15. The passage 12 directs the pressure fluid further into valve 15 by means of a passage 17 as shown in Figure 4. The pressure fluid remains static about spool 18 of valve 15 between its two central lands 19 and 20 as long as the aircraft does not change attitude. Spool 18 also has end lands 21 and 22 in sliding engagement with a liner 23 in the housing 13. The remainder of the valve assembly 15 consists of a sleeve 24 carrying a free sliding piston 25, end caps 26 and 27, sump outlets 28 and 29, a metering needle 30 and a metering bushing 31. Land 22 is provided with a series of longitudinal passages such as shown at 32 and 33 in Fig. 8 to prevent any pressure build-ups between itself and the sleeve 24. The metering bushing 31 is shown in enlarged detail in Figure 14.

Pressure fluid from passage 16 is directed to the bushing 31 by a passage 34. The bushing directs the fluid into valve 15 between end land 21 and cap 26. At the other end of valve 15 a passage 35 directs pressure fluid from passage 16 to passage 36 and into the space between piston 25 and cap 27. Passage 34 also directs pressure fluid from passage 16 to a passage 37 in valve 14. Valve 14 has a spool 38 in sliding engagement with a liner 39. The spool 38 which has three lands 40, 41 and 42 is held in the position shown in Figure 4 when the automatic pilot is "off" by action of a compression spring 43 which is held between land 42 and end cap 44. An end cap 45 seals the other end of valve 14, and at the same time provides a protruding stop 46 to engage a stop 47 of spool 38. The stops 46 and 47 thus provide a limit of travel for spool 38 and make is possible for pressure fluid to be received in valve 14 between land 40 and end cap 45. The valves 14 and 15 are connected by passages 48 and 49 as shown in Figures 7 and 8 and in dotted lines in Figures 4. Passages 48 and 49 also connect with servomotor lines 50 and 51 which are shown in Figure 8 and in dotted lines in Figure 4.

The operation of the valves 14 and 15 is to be considered before continuing with the description of the rest of the servo. With the automatic pilot turned "off" spool 38 in valve 14 will be in the position shown in Figures 4 and 7. Passages 48 and 49 are open to each other and to both sides of the servomotor, to be discussed later, and consequently the control of the aircraft will be free. Any manipulation of the aircraft control will merely by-pass fluid through valve 14 from one side of the motor to the other.

When the automatic pilot is turned "on," the pressure fluid is received in valve 14, as previously described, between land 40 and the end cap 45, forcing spool 38 away from cap 45 against the action of spring 43. The spool 38 will move until the force of the spring equals the force of the pressure fluid which is predetermined to be when land 41 is between the entrances to passages 48 and 49. By moving to this position the spool 38 has cut off the servomotor by-pass and the control will become "locked" in whatever position it happens to be.

Meanwhile, simultaneous with the movement of spool 38 is the automatic centralizing of the spool 18 in balanced oil valve 15. The centralized or balanced position of the valve is the one in which lands 19 and 20 are directly over passages 48 and 49 as in Figure 8. The position of the spool is controlled at one end by piston 25 and at the other end by metering bushing 31 and needle 30. The linkage controlling the needle movement will be described later. The piston 25 forces the spool 18 toward the needle 30 as pressure fluid is received from passage 36 in the sleeve 24. The movement of spool 18 by piston 25 is opposed by the build-up of pressure behind land 21 as pressure fluid is received from metering bushing 31. The needle 30 is moved axially with the spool by its linkage into greater or lesser penetration into chamber 52 in the spool 18, and, in doing so, more or less pressure fluid is allowed to get past insert 53 in land 21 and through the sump passage 54. If in Figure 8 the needle is moved into greater penetration into chamber 52 the spool 18 will move to the right. If a lesser penetration is effected the spool 18 will move to the left. Although land 21 has four times the cross sectional area that piston 25 does, the ratio between the cross section area at the point of needle penetration into chamber 52 is four to one compared to the smallest inlet area of the metering bushing 31, so that the relative pressure potential at either end of spool 18 is the same. At the centralized position of the spool 18, the needle 30 is positioned so that it is bleeding enough pressure fluid past insert 53 to sump passage 54 to make the forces acting on land 21 and piston 25 equal.

Controlling the movement of the servomotor and consequently the aircraft control with which the servomotor is connected is accomplished by positioning the needle 30 in valve 15. For example, in Figure 8, if the needle is moved further into chamber 52 the force of the pressure fluid on land 21 will increase and overcome the force of the pressure fluid acting on piston 25. The spool 18 will move to the right, and in doing so will open the line 49 to the high pressure section between lands 19 and 20 of the spool, while at the same time opening line 48 to the sump outlet 28 between lands 21 and 19 of the spool. Since valve 14 has closed the by-pass from passage 49 to passage 48 as previously described, pressure fluid will flow from passage 49 into the servomotor by means of passage 51 as shown in Fig. 8. The flow of low pressure fluid from the motor will be through passage 50 to passage 48 and out through sump outlet 28 of the valve 15. If the needle is moved in the opposite direction the exact opposite of the example just given is true. Actually the movements of the spool and needle are usually very slight, that is, only enough to actuate the servomotor the amount necessary to give a corrective action to the particular control associated with the motor. A built-in follow-up system, to be discussed later, limits the control action of the servomotor by automatically and simultaneously repositioning the needle to the centralized or balanced position as the control is applied.

The servomotor shown in Figures 2 and 9 consists essentially of the motor casing 3, a stationary vane 55 secured to the casing by bolts 56 and 57, a moving vane 58 and a rotatable shaft 59 mounted on stationary vane and carrying the moving vane. The vanes 55 and 58 have pressure responsive expandable fluid seals 60, 61 and 62 as described and claimed in a copending application entitled "Fluid Seal" Serial No. 640,296, now Patent No. 2,466,302 dated April 5, 1949, in the names of Lysle D. Cahill and Roy M. Denham. Pressure fluid is received in seal 60 from a passage 63, shown in Figure 2, which connects directly to passage 11. The seals 61 and 62 are expanded to firmly engage the casing 3 by means of pressure fluid received from their particular side of vane 58 in passages 64 and 65, respectively. The primary reason for the use of expandable seals is to make a more efficient hydraulic servomotor. The seals 60, 61 and 62 actually act to limit the loss in pressure differential due to leakage from one side of vanes 55 and 58 to the other.

A bushing 66 in base 1 acts as a bearing for one end of the motor shaft 59. The bushing is provided with a detent 67 for receiving a fluid seal 68 to prevent leakage from the servomotor into the base. A bushing 69 in motor casing cover 70, having detents 71 and 72 to receive fluid seals 73 and 74, acts as a bearing for the opposite ends of motor shaft 59. The casing cover 70 is secured to casing 3 by a number of screws 75 one of which is shown in Figure 2.

The motor shaft 59 extends out of casing 3 past casing cover 70 to carry on its extremity a "Hayes Brake" assembly 76 shown in detail in Figures 11 and 12. The brake is keyed to the shaft 59 by key 77 and consists essentially of an outer ring 78 having annular inner surface gear teeth 79, six gear segments 80 having teeth 81 opposite the teeth 79, a circumferential spring 82 carried in a detent in the segments 80 to retract the segments when the automatic pilot is off, a pressure responsive expandable rubber element 84 for carrying the segments 80, and two casing members 85 and 86. The members 85 and 86 are secured together by means of screws 87, 88, 89 and 90 shown in Figure 10. An end plate 91 is shown in Figures 2 and 10 positioned in a recess in casing member 86 to hold key 77 in a fixed position.

Pressure fluid is immediately directed to the clutch, or "Hayes Brake" as the automatic pilot is turned "on" by means of passages 92, 93, 94, 95 and 95A as shown in Fig. 2. Passage 92 is shown connected into fixed vane 55 behind the expandable fluid seal 60 so as to receive pressure fluid therefrom. When pressure fluid is received the "Hayes Brake" gear segments 80 are pushed outwardly by expandable rubber element 84 until the teeth 81 engage teeth 79 on outer ring 78 as in Figure 11. Thus it is seen that any movements of the servomotor result in corresponding movements of the outer ring 78 when the automatic pilot is "on."

The outer ring 78 is connected mechanically with main cable drum 4 by a linkage having an emergency disconnect feature. This linkage, which is shown in Figures 2, 10 and 13, consists of a mounting bracket 96 secured to drum 4 by screws 97 and two parallel arms 98 and 99 pivoted at bracket 96 on pivot 105 and extended across the "Hayes Brake" to the opposite side of the drum 4. The arms 98 and 99 are connected by a base piece 100 as shown in Figure 13 forming a substantially U-shaped member which normally seats snugly against ring 78 between protruding lips 101 and 102. A bracket 103, secured to drum 4 by screws 104, carries a second pair of arms 106 and 107 by means of pivot 108. The arms 106 and 107 which run parallel to and between arms 98 and 99 are connected to those arms by a pin 109 directly above the lips 101 and 102 of the ring 78. Two spacers 110 and 111 are placed between arms 106 and 107. The ends of arms 106 and 107 are forked to receive a pin 112 shown extending through a release lever 113. The lever 113 is positioned in a sleeve 114 within shaft 59, and is held there under the action of a spring 115 which engages a fork 116 that in turn engages the pin 112. A guide shaft 117 is provided for the spring 115. In the case of an emergency where it would be necessary to operate the emergency disconnect it is merely necessary to pull lever 113. Pulling 113 moves arms 106 and 107 by means of a pin 112. The arms 98 and 99 are also moved, as arms 106 and 107 move, until the base piece 100 is completely free of lips 101 and 102 on ring 78. This action completely frees main cable drum 4 from any connection with the "Hayes Brake" and servomotor. The spring 115 holds the lever 113 in its disengaged position just as it formerly held the lever in the engaged position. Thus it is seen that a positive emergency disconnect means has been provided for the servo unit.

Figure 5:
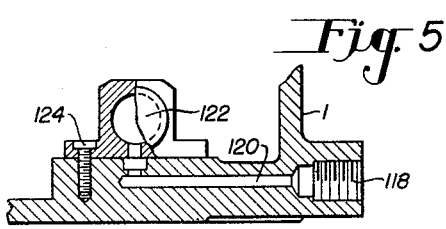
Figure 5 is an enlarged detail sectional view taken along 5—5 of Figure 3 showing the fluid passages leading to the bellows.
Figure 6:
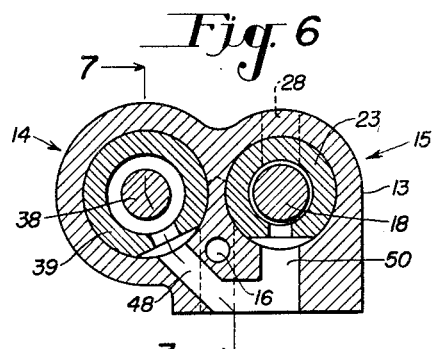
Figure 6 is an enlarged detail view in section taken along line 6—6 of Figure 4, showing the oil valves.

The mechanism for controlling the ultimate movements of the drum 4 by positioning needle 30 in valve 15 is shown in Figure 3. Two pressure fluid inlets 118 and 119 are provided in base 1 to transmit by means of passages 120 and 121 differential pressure signals created by a flight control unit to a pair of opposed bellows units 122 and 123. Figure 5 which is taken from Figure 3 clearly shows the path of the pressure fluid from inlet 118 through passage 120 and into bellows 122. Bellows 122 and 123 are secured to base 1 by screws 124 and 125, and 126 and 127, respectively.

A rectangular bracket 128 is positioned so that one side 129 is engaging the opposed ends of bellows 122 and 123. Protruding from bracket 128 is a shaft 130 which engages an arm 131. The arm 131 is pivotally connected at one end to needle 30 by a pivot pin 132, and at the other end is pivotally connected by pivot pin 133 within the fork shaped end piece 134 of an arm 135. The end of arm 131 is provided with a counterweight 136. Arm 135 is pivotally carried by a pivot pin 137 in bracket 138 which is secured to base 1 by a screw 139. A spring 140, secured at one end to a screw 141 in base 1 and at the other end to end piece 134 of arm 135, opposes the action of counterweight 136 and tends to give a counterclockwise movement to the arm 135. A cam rider 142 is provided on the end of arm 135 to ride on a cam 143 on the end of motor shaft 59 under action of the spring 140. Cam 143 is secured to shaft 59 by means of a washer 144 and screw 145.

As any differential pressure signal is received by the bellows 122 and 123 the bracket 128 will be moved in the direction of the expansion of the bellows under greater pressure. Arm 131 and consequently needle 30 are moved accordingly. As previously described, moving needle 30 causes the spool 18 in valve 15 to move causing a pressure fluid flow to and from the motor. As the moving vane 58 and the motor shaft 59 are turned to rotate the main cable drum 4 in order to get the corrective control action for the aircraft, the cam 143 is also moved. The cam rider 142 causes arm 135 to re-position the needle 30 to the balanced position by means of its linkage with arm 131 as the control action is applied. In this manner the built-in follow-up action of the servo is instantaneous with the applied control action eliminating the over or under control of the aircraft caused by the cable and pulley follow-up systems used in former automatic pilot designs.

Fluid expelled from valve 15 through outlets 28 and 29 which completely lubricates the moving elements in base 1, has a sump return outlet 146 in base 1 is shown in Figure 3.

An additional, though conventional, safety feature of the servo unit is the inclusion of two overpower valves 147 and 148 in fixed vane 55 of the hydraulic motor portion of the servo. The valves, one of which is clearly shown in Figure 9, consist of a hollow threaded plug 149 holding a ball 150 under compression against the action of a spring 151. With the automatic pilot "on" the pilot may overpower a control by exerting enough force on the control wheel or pedal to overcome the setting of valve 147 or 148. The force exerted is transmitted from the control cable to drum 4, to the "Hayes Brake" then to shaft 59 and moving vane 58 and finally to the pressure fluid in casing 3. When enough force is exerted by the pilot to overpower the control either the ball 150 in valve 147 or 148 is unseated from internal engagement with plug 149 permitting a fluid flow through the plug from one side of moving vane 58 to the other, the direction of flow and the valve affected being determined by the direction of movement of the vane itself.

From the foregoing description of the invention it is seen that a compact servo unit having

We claim:

1. An hydraulic servo unit for use in aircraft automatic pilots for controlling the movements of an aircraft control surface in response to differential signals received from the transmitter of the pilot, comprising an hydraulic fluid displacement motor to actuate said control surface, an inlet for receiving displacement fluid for driving said motor, means to control the displacement fluid flow to and from said motor, and fluid displacement responsive means between said motor and said control surface for causing a positive engagement between said motor and said control surface as said automatic pilot is turned "on."

2. An hydraulic servo unit for use in aircraft automatic pilots for controlling the movements of an aircraft control surface in response to differential signals received from the transmitter of the pilot, comprising an hydraulic fluid displacement motor to actuate said control surface, and fluid displacement responsive means between said motor and said control surface for causing a positive engagement between said motor and said control surface as said automatic pilot is turned "on."

3. An hydraulic servo unit for use in aircraft automatic pilots for controlling the movements of an aircraft control surface in response to differential signals received from the transmitter of the pilot, comprising an hydraulic fluid displacement motor to actuate said control surface, means associated with said motor for receiving said control surface cable, and fluid displacement responsive means between said motor and said control surface for causing a positive engagement between said motor and said control surface as said automatic pilot is turned "on" and for causing a positive disengagement between said motor and said control surface as said automatic pilot is turned "off."

4. An hydraulic servo unit for use in aircraft automatic pilots for controlling the movements of an aircraft control surface in response to differential signals received from the transmitter of the pilot, comprising an hydraulic fluid displacement motor for actuating said control surface, a drum mounted on bearings about said motor for connection to said control surface and a hydraulically actuated clutch system between said motor and the drum for causing a positive engagement between said motor and said drum as said automatic pilot is turned "on" and for causing a positive disengagement between said motor and said drum as said automatic pilot is turned "off."

5. An hydraulic servo unit for use in aircraft automatic pilots for controlling the movements of an aircraft control surface in response to differential signals received from the transmitter of the pilot, comprising an hydraulic fluid displacement motor for actuating said control surface, fluid displacement responsive means between said motor and said control surface for causing a positive engagement between said motor and said control surface as said automatic pilot is turned "on," and manual means for positively disengaging said motor from said control surface.

6. An hydraulic servo unit for use in aircraft automatic pilots for controlling the movements of an aircraft control surface in response to differential signals received from the transmitter of the pilot, comprising an hydraulic fluid displacement motor for actuating said control surface, a drum mounted on bearings about said motor for connection to said control surface, a hydraulically operated clutch system between said motor and said control surface for causing a positive engagement between said motor and said control surface as said automatic pilot is turned "on" and for causing a positive disengagement between said motor and said control surface as said automatic pilot is turned "off," and a manual emergency mechanical means for positively disconnecting said clutch system from the drum when said automatic pilot is "off," or "on."

7. An hydraulic servo unit for use in aircraft gyroscopic automatic pilots for controlling the movements of an aircraft control surface in response to differential signals received from the transmitter of the pilot, comprising an hydraulic fluid displacement motor for actuating said control, a self-balancing oil valve for controlling displacement fluid flow to said hydraulic motor, a pair of opposed displacement responsive bellows linked to said oil valve for regulating said valve in response to differential signals from said gyroscopic pilot for determining the direction of movement of said motor, a follow-up system associated with said motor and with said balanced oil valve for limiting the movement of said motor in proportion to the regulation applied by said bellows to said oil valve, a drum mounted on bearings about said motor for connection to the control surface, a hydraulic clutch system between said motor and said drum for causing a positive engagement between said motor and said drum as said automatic pilot is turned "on" and for causing a positive disengagement between said motor and said drum as said automatic pilot is turned "off" and a manual emergency mechanical means for positively disconnecting said clutch system from said drum when said automatic pilot is "off" or "on."

LYSLE D. CAHILL.
WALTER T. BUHL.
ALFRED S. HORWITZ.

REFERENCES CITED

The following references are of record in the file of this patent:

UNITED STATES PATENTS

| Number | Name | Date |
|---|---|---|
| 1,938,338 | Jimerson | Dec. 5, 1933 |
| 2,179,179 | Fischel | Nov. 7, 1939 |
| 2,225,321 | Schwendner | Dec. 17, 1940 |
| 2,226,191 | Alkan | Dec. 24, 1940 |
| 2,227,375 | Carlson | Dec. 31, 1940 |
| 2,245,562 | Becker | June 18, 1941 |
| 2,342,184 | Fawcett | Feb. 22, 1944 |
| 2,348,768 | Warner | May 16, 1944 |
| 2,356,597 | Kronenberger | Aug. 22, 1944 |
| 2,358,845 | Alexanderson | Sept. 26, 1944 |
| 2,372,710 | Chisholm | Apr. 3, 1945 |
| 2,390,119 | Nisbet | Dec. 4, 1945 |
| 2,453,650 | Alexanderson | Nov. 9, 1948 |

FOREIGN PATENTS

| Number | Country | Date |
|---|---|---|
| 217,121 | Switzerland | Feb. 16, 1942 |

[Note: Claim 5 continues - the invention has been provided for use in aircraft hydraulic automatic pilots. It is of course realized that the invention may be readily adapted to other types of hydraulic control systems and to other types of vehicles than aircraft.]